United States Patent Office 2,888,471
Patented May 26, 1959

2,888,471
PROCESS FOR PREPARING 17α-ETHINYL-Δ$^{1,4}$-ANDROSTADIENE-17β-OL-3-ONE

Franz Sondheimer, Rehovoth, Israel, and George Rosenkranz, Mexico City, Mexico, assignors to Syntex S.A., Mexico City, Mexico, a corporation of Mexico No Drawing. Application March 13, 1956
Serial No. 571,140

Claims priority, application Mexico March 25, 1955

6 Claims. (Cl. 260—397.4)

The present invention relates to a novel cyclopentanophenanthrene derivative and to a process for the production thereof.

More particularly, the present invention relates to the novel progestational hormone 17α-ethinyl-Δ$^{1,4}$-androstadiene-17β-ol-3-one (1-dehydro-ethinyltestosterone) and to a process for the production thereof.

The novel compound of the present invention is an active progestational hormone having a pronounced leutinizing effect and is especially desirable for oral administration.

In accordance with the present invention the surprising discovery has been made that when the known compound Δ$^{1,4}$-androstadiene-3,17-dione is treated with an alkali acetilide in liquid ammonia, a selective reaction takes place with the keto group at C-17 without a reaction at C-3 to give in a single step the novel desired 17α-ethinyl-Δ$^{1,4}$-androstadiene-17β-ol-3-one.

The following equation illustrates the present invention:

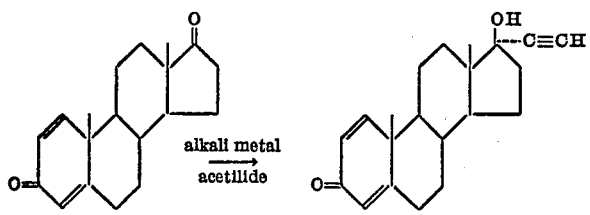

In practicing the invention above outlined, a solution of an alkali (preferably alkali metal) acetilide in liquid ammonia is prepared by adding ferric nitrate to a flask containing liquid ammonia, and then adding the alkali metal in small pieces under continuous stirring and with cooling in Dry Ice. The conversion into the sodamide, in the case of sodium, is complete when the color of the solution changes from blue to gray. Thereafter a stream of acetylene is passed through the liquid for a substantial period of time, i.e., of the order of 1 hour. To the alkali metal acetilide solution in liquid ammonia thus prepared, there is added the steroid, i.e., Δ$^{1,4}$-androstadiene-3,17-dione, preferably in solution in an organic solvent such as ether. The steroid is added slowly, preferably over a period of about 30 minutes and stirring is then continued for a further period, as for example 4 hours, with cooling as in Dry Ice. Ammonium chloride is then added, the ammonia is allowed to evaporate and the water and the ether added to the residue. The ether layer is purified and then evaporated to dryness. Chromatography of the product then gives the desired product 17α-ethinyl-Δ$^{1,4}$-androstadiene-17β-ol-3-one.

The following specific examples serve to illustrate but are not intended to limit the present invention:

Example I

A solution of sodium acetilide in liquid ammonia was prepared in the following way:

A small amount of ferric nitrate was added to a flask containing liquid ammonia and then 10 g. of sodium metal was added in small pieces, under continuous stirring and cooling in Dry Ice. After 15 minutes the conversion into sodamide was complete, which was noticed by the change of color from blue to gray. A stream of acetylene was then passed through the liquid for 1 hour.

In the course of 30 minutes there was slowly added to the solution of sodium acetilide thus prepared a solution of 10 g. of the known Δ$^{1,4}$-androstadiene-3,17-dione in 700 cc. of ether and the stirring was continued for a further 4 hours, still cooling in Dry Ice. Then 30 g. of ammonium chloride was cautiously added, the ammonia was left to evaporate and water and ether were added to the residue. The ether layer was washed with dilute hydrochloric acid, with aqueous sodium bicarbonate solution and water, dried over sodium sulfate and evaporated to dryness. Chromatography in a column with activated alumina afforded 3.2 g. of 17α-ethinyl-Δ$^{1,4}$-androstadiene-17β-ol-3-one with melting point 227–229° C., [α]$_D$ —15°, λ max. 244 mu, log ε 4.24.

Example II

Working under exactly the same conditions as described in Example I, except that lithium acetilide was used instead of sodium acetilide, there was obtained the same product in slightly lower yield.

We claim:
1. A process for the preparation of 17α-ethinyl-Δ$^{1,4}$-androstadiene-17β-ol-3-one comprising reacting Δ$^{1,4}$-androstadiene-3,17-dione with an alkali acetilide.
2. The process of claim 1, wherein the reaction is carried out in solution in liquid ammonia.
3. The process of claim 1, wherein the alkali acetilide is sodium acetilide.
4. The process of claim 2, wherein the alkali acetilide is sodium acetilide.
5. The process of claim 1, wherein the alkali acetilide is lithium acetilide.
6. The process of claim 2, wherein the alkali acetilide is lithium acetilide.

References Cited in the file of this patent

Bersin, Zeit. fur Naturforschung 4b, 195–199 (1949).